May 21, 1957 — R. C. BARKER — 2,792,773
BROILER BUCKET
Filed July 27, 1955 — 2 Sheets-Sheet 1
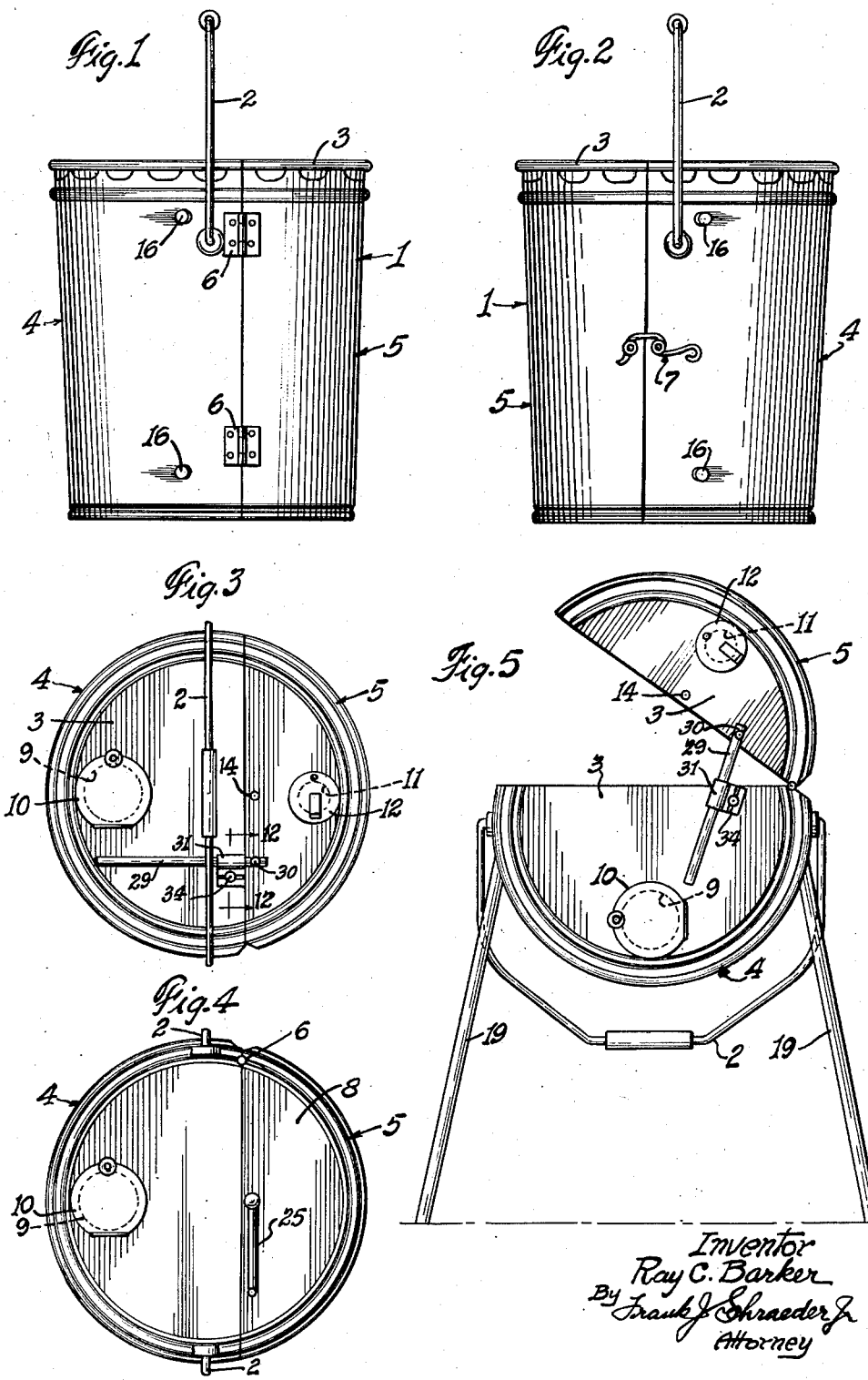
Inventor
Ray C. Barker
By Frank J. Schraeder Jr.
Attorney

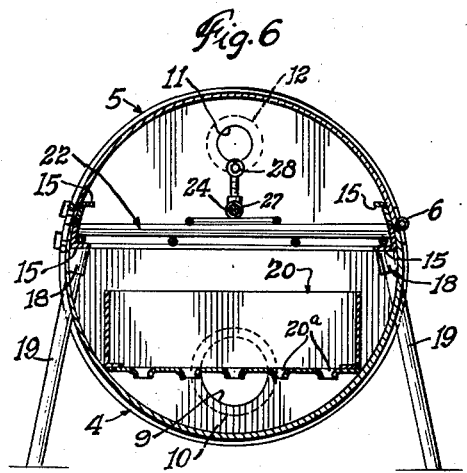
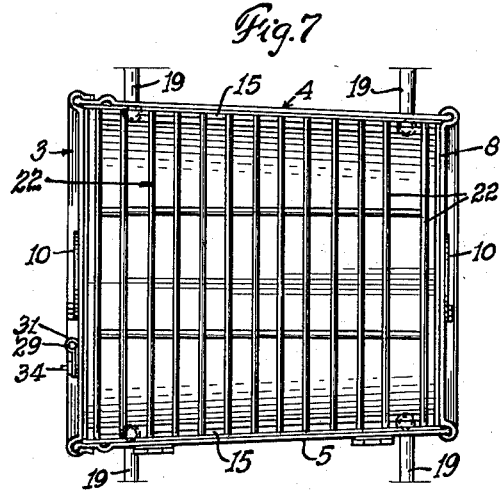
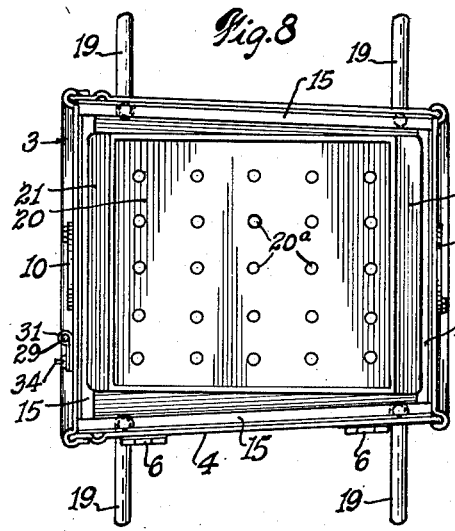
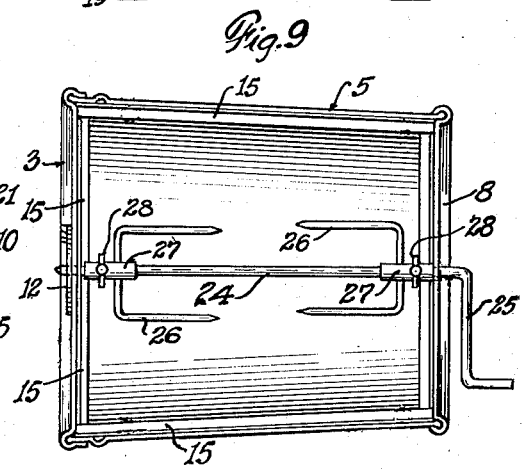
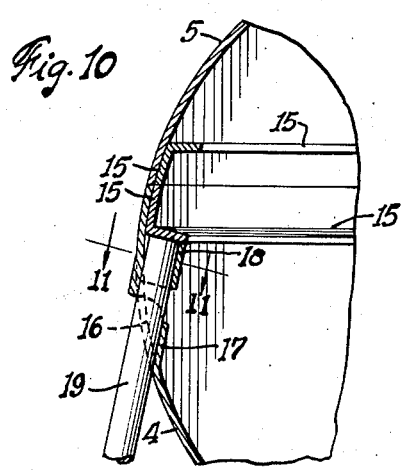
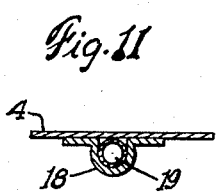
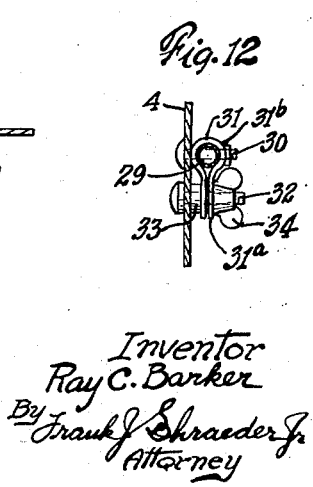

United States Patent Office 2,792,773
Patented May 21, 1957

2,792,773
BROILER BUCKET
Ray C. Barker, Wichita, Kans.
Application July 27, 1955, Serial No. 524,644
5 Claims. (Cl. 99—421)

The present invention relates to portable apparatus for cooking food in various ways, and has for its primary object to produce an apparatus which shall be a great improvement over those of which I have any knowledge.

All of the prior portable stoves and the like of which I am aware are too expensive, because of the manner in which they are constructed. One of the objects of the invention is to develop a method of construction that will greatly reduce the cost of making the completed apparatus.

Further objects are to produce an apparatus that may be carried about in the same way as an ordinary water bucket or other bucket; that serves as a closed container for detachable legs and attachments for different styles of cooking, when the apparatus is not being used for cooking; and which preferably shall be an actual bucket divided and adapted to be laid on its side with one section forming a lid or cover that may be opened to any desired extent; and wherein the section that is underneath, during cooking period, contains a pan or tray for fuel and a grid, while the other section is provided with means to support articles of food at varying distances above the fuel and permit such articles to be rotated while cooking.

In a preferred embodiment of the invention I make use of any sturdy, conventional, metal pail or bucket provided with a lid and a bail. I weld or otherwise fix the lid to the body of the bucket and cut the bucket lengthwise into two unequal sections; the bail remaining on the larger section. The two sections are connected together at one pair of meeting longitudinal edges by suitable hinges, while a latch is provided to keep the longitudinal edges of the other pair from separating. Sockets are provided in the larger section near the ends of its longitudinal edges, to receive the upper ends of detachable legs when the apparatus is set up for use with the larger section underneath. A detachable fuel supporting pan or tray is set into the larger section, and a grid is set on one flange of an angle iron reinforcing strip welded to the inner sides of the walls of the larger section, close to the four free edges. The end walls of the smaller section contain small holes, through which a rotatable rod, forming part of a spit device on which food articles may be mounted, extend; the rod having a handle at one end for turning the same. A simple connecting device between the end walls at one end of the bucket serves to hold the smaller section raised at any desired angle to vary the distance between the rod and a bed of fuel in the tray. The legs and the handled rod may be stored within the bucket so that when not in use, the apparatus resembles a mere pail except for the holes just mentioned and air-inlet and ventilating openings.

The various features of novelty whereby the present invention is characterized will be pointed out in the claims; but, for a full understanding of the invention and its objects and advantages, reference may be had to the following detailed description taken in connection with the accompanying drawings, wherein:

Fig. 1 is a side view of a preferred form of apparatus embodying the present invention, ready for carrying, shipment or storage;

Fig. 2 is a view similar to Fig. 1, looking at the side opposite that shown in Fig. 1;

Figs. 3 and 4 are respectively a top plan view and a bottom plan view of the apparatus;

Fig. 5 is an end view of the apparatus, set up ready for use and with the lid section partially raised;

Fig. 6 is a vertical section taken at right angles to the axis of the apparatus, with the lid section down;

Fig. 7 is a view looking down on the lower shell section as it appears in Figs. 5 and 6, with the lid section omitted;

Fig. 8 is a view similar to Fig. 7, without the grid and thus exposing the fuel-supporting pan;

Fig. 9 is a view looking directly into the open side of the smaller, cover section of the shell, with the spit device mounted therein;

Fig. 10 is a section, on a larger scale through the wall of the closed shell on a plane at right angles to the axis of the shell and intersecting one of the legs;

Fig. 11 is a section on line 11—11 of Fig. 10; and

Fig. 12 is a section on line 12—12 of Fig. 3, on a larger scale and showing only a fragment of the shell.

Referring to the drawings, 1 represents a metal shell which is preferably a conventional bucket having the usual bail 2 for carrying the same about and having its lid 3 welded or otherwise fixed to the body portion. The bucket constituting the shell is shown as being round but may take any other desired shape.

The bucket is divided lengthwise into two sections, 4 and 5; section 4 being larger than the other so as not to disturb the bail. The two shell sections are connected together by a pair of hinges 6 along one pair of meeting longitudinal edges. A latch device 7 serves to hold the other pair of long meeting edges in contact with each other when the shell is to be kept closed.

In one end wall of shell section 4 (top wall 3 of the bucket), and in the opposite end wall 8, are large air inlets 9 provided with movable covers 10; the centers of these inlets being near the outer ends of radii at right angles to the plane of division between the two shell sections. In that part of end wall 3 included in shell section 5 is a smaller vent hole 11 provided with a movable cover 12. Each end wall in section 5 also contains a small hole 14 near and midway of the length of the straight edge of that wall.

Along the inner side of each shell section, near and paralleling the four straight edges of each section, is a reinforcing angle iron strip 15 welded to the metal of the shell with one flange parallel to the plane along which the bucket was severed.

Near each end of the body portion of larger shell section 4, and not far from the longitudinal free edges of the latter, are four holes 16, as shown in Figs. 1 and 2. These holes are created in such a manner as to leave trough-shaped lips 17 on the inside of the shell, as shown in Fig. 10. Just underneath the projecting flange of the adjacent reinforcing strip 15 is a sleeve 18 welded to the wall so that lip 17 serves as a fragment of a like sleeve registering therewith.

With this arrangement, when a leg 19, preferably in the form of a piece of tubing, is inserted into one of the holes 16, it is guided into the corresponding sleeve 18 and then is stopped by coming in contact with reenforcing strip 15.

Consequently the bucket may be supported solidly on its side by four legs, with larger section 4 underneath and section 5 on top. The legs are short enough to permit them to be stored within the shell, which may then be closed in Figs. 1 and 2.

Suitable means are provided to permit charcoal or other fuel to be burned in the lower section, preferably out of contact with the walls of the shell. This may conveniently be accomplished by using a simple pan 20 that rests on the cylindrical wall of the lower section of the shell so as to allow free space within the latter both below and above and outwardly from the vertical walls of the pan. The pan need only be provided with holes 20$^a$ in the bottom to provide adequate updraft to support combustion. As best shown in Fig. 6, inlet openings 9 allow air to enter the shell below the pan. The pan is considerably shorter than the distance between end walls 3 and 8, and I have therefore provided the pan with flanges 21 projecting therefrom in the plane of the pan bottom toward walls 3 and 8. These flanges divide the air coming in through inlets 9, so that some must pass under the pan while some flows up past the ends and along the sides of the pan.

One of the attachments that is used is a grid 22 of a size to fit loosely into the open side of shell section 4 and rest on the horizontal flange of reenforcing strip 15.

The small holes 14 in the end walls of the smaller section 5 are adapted to receive a long rod 24 extending throughout the length of the shell. One end of this rod is pointed and on the other end is a crank 25 for turning the rod. While the rod alone may be used as a spit to hold articles of food in broiling relation to the hot coals, I have also provided two conventional two-tined works 26, 26. Each fork is U-shaped and is provided with a stem in the form of a sleeve 27 midway between and parallel to the tines. These sleeves are of a size to fit slidably on rod 24 and they may be secured against movement relatively to the rod by set screws 28. The fork nearest the handle end of the rod may serve as a stop to prevent accidental withdrawal of the rod from hole 14 at the far end of the shell section.

When the spit device is being used, it is necessary that one be able to set the same at the proper distance from the coals required by the nature of the food and the degree of cooking desired. I have therefore provided means to prop the smaller shell section 5 in various angular positions. When section 5 is completely lowered, the shell is closed and the spit is cloest to the coals; but the spit recedes as section 5 is swung up.

As best shown in Figs. 3, 5 and 12, the prop means for section 5 is a little bar 29 connected at one end to end wall 3 of section 5 by a volt 30 which allows it to swing in a plane parallel to that wall. On end wall 3 of shell section 4 is a clip 31 that embraces this bar. This clip is a little strap folded at the middle and deformed to create two flat wings 31$^a$ connected by a sleeve-like part 31$^b$. A small bolt 32 passes through wings 31$^a$ and wall 4, as well as through a spacer 33 between the wings and the wall. A wing nut 34 on bolt 32 serves to press the wing elements of the clip together and clamp the sleeve about the bar. Also, the entire clip is clamped against wall 4 so that it cannot turn. When the nut is loosened, shell section 5 may be swung up from its shell-closing position in Fig. 6 to any raised position as, for example, that occupied in Fig. 5. Then, upon tightening the wing nut, bar 29 is firmly locked in place and holds section 5 up until the wing nut is again loosened.

When cooking with the shell closed, gases can escape through opening 11 in the upper shell section, provided the cover 12 be first set to permit a flow of gases therethrough. The intake of air, not only when the shell is closed, but also when it is open, is controlled by the covers 10 associated with air inlets 9.

It will be seen that the apparatus may be disassembled without the use of tools and even without removing any small fastenings that might easily be mislaid or lost. The legs are simply pulled out and laid in the larger shell section. The fuel pan and the grid may remain in their positions of use. The spit devices are easily disconnected and stored within the shell, which then need only to be closed and latched against reopening.

It is believed that no detailed description of cooking operations is needed; it being obvious that anything small enough to be accommodated in the apparatus may be cooked in any of the usual ways, broiling on the grid or on the spit being only two of the procedures for which the apparatus is well adapted. It is for this reason that the word cooking is intended to mean any method in which heat is used for the preparation of food.

I claim:

1. A broiler bucket comprising a conventional metal pail, provided with a bail hinged to swing about an axis transverse to the axis of the pail, having its cover attached permanently thereto and adapted to stand upright on its bottom when not in use, the pail being divided lengthwise into two unequal sections the larger of which carries the bail, a hinge connection between one pair of the meeting lengthwise edges of the sections, means to lock said sections together at will at the other pair of meeting lengthwise edges, leg means on and detachably from the larger section to support the pail on its side with the smaller section on top, means within the pail to support fuel to be burned therein and means located in both sections of the pail for supporting food to be cooked, and both of said sections containing adjustable openings in their ends leading to the surrounding atmosphere.

2. An apparatus of the character described comprising a metal shell divided lengthwise into two sections, hinge means connecting said sections together at one pair of meeting longitudinal edges, means to support said shell in a horizontal position with one section above the other, a fuel pan mounted in the lower of the two sections, a rotatable spit in and extending lengthwise of the upper of said sections, and means to secure the latter section at any desired angle relative to the hinge axis to vary the distance between the spit and the fuel pan.

3. An apparatus as set forth in claim 2 having, in addition, means at the longitudinal edges opposite those that are hinged together to lock the shell in a closed condition, and having as the means for supporting the shell legs that are detachable and of a size to be stored within the shell when detached.

4. An apparatus as set forth in claim 3 having, in addition, a handle attached to the shell for the purpose of carrying the apparatus from place to place.

5. An apparatus of the character described comprising a metal shell in the form of a pail having a cover in fixed relation therewith and provided with a bail extending across one end and connected to opposite sides of the pail near that end, the shell being divided lengthwise into two unequal sections to the larger of which the bail is attached, the larger section having sockets that face down when the pail is placed on its side with the larger section underneath, legs detachably fitted into said sockets, hinge means pivotally connecting the two sections together at one pair of longitudinal meeting edges, means within the larger section to support fuel to be burned therein, means in the larger section to support food above fuel in the fuel supporting section, a rotary spit device in the smaller section to support food to be cooked, and means connecting said sections to hold the smaller section at any desired angle relative to the other section to vary the distance of the food on the spit from the support for the fuel.

References Cited in the file of this patent

UNITED STATES PATENTS

| | | |
|---|---|---|
| 1,642,604 | Cox | Sept. 13, 1927 |
| 2,515,521 | Loffredo | July 18, 1950 |
| 2,520,578 | Treloar | Aug. 29, 1950 |
| 2,588,091 | Dornbush | Mar. 4, 1952 |
| 2,608,190 | Winning et al. | Aug. 26, 1952 |
| 2,666,426 | Pollard | Jan. 19, 1954 |